United States Patent [19]

Spicer

[11] 4,172,873
[45] Oct. 30, 1979

[54] METHOD FOR APPLYING A HEAT SHRINKABLE SLEEVE TO A PLASTIC BOTTLE

[75] Inventor: John F. Spicer, Toledo, Ohio
[73] Assignee: Owens-Illinois, Inc., Toledo, Ohio
[21] Appl. No.: 921,532
[22] Filed: Jul. 3, 1978
[51] Int. Cl.² ............................................. B29C 13/00
[52] U.S. Cl. ..................................... 264/230; 156/86
[58] Field of Search ............. 264/230, 342 R; 156/86; 53/30 S; 432/10, 11, 124; 215/12 R

[56] References Cited

U.S. PATENT DOCUMENTS

| | | | |
|---|---|---|---|
| 3,396,460 | 8/1968 | Wetmore | 264/230 UX |
| 3,470,046 | 9/1969 | Verdin | 264/230 X |
| 3,778,220 | 12/1973 | Ahrendt et al. | 432/124 X |
| 4,059,400 | 11/1977 | Heckman et al. | 432/124 |
| 4,072,553 | 2/1978 | Braker et al. | 156/86 X |
| 4,092,382 | 5/1978 | Heckman et al. | 264/230 X |

*Primary Examiner*—Jan H. Silbaugh
*Attorney, Agent, or Firm*—Charles S. Lynch; M. E. Click; D. H. Wilson

[57] ABSTRACT

Heat sensitive containers with loosely fitting circumferentially heat shrinkable sleeves are conveyed linearly while rotating, past heating means for impinging hot gas against the sleeve serially from the bottom to the top thereof to heat shrink the sleeves around the bottles; also disclosed is delivering different amounts of heat per unit height to at least two axially adjacent horizontal zones of said sleeve.

10 Claims, 4 Drawing Figures

METHOD FOR APPLYING A HEAT SHRINKABLE SLEEVE TO A PLASTIC BOTTLE

This invention relates to a process for applying circumferentially heat shrinkable plastic sleeves or labels, which sleeves are usually decorated with product information, at a high rate to heat sensitive plastic containers such as bottles.

Heat shrinkable plastic sleeves have been applied to glass bottles by applying infrared heat at a high rate to a bottle having the cylindrical pre-decorated plastic sleeve loosely fitted around the bottle and while rotating the bottle applying infrared heat first to the mid-section and then to the end sections to first shrink the mid-section of the sleeve, then the end sections. See U.S. Pat. No. 4,092,382 and related U.S. Pat. No. 4,059,400. Before placing the sleeve on the bottle the bottle is preheated to 150° to 250° F. U.S. Pat. No. 4,016,706 similarly directs heat toward the middle of a foamed sleeve on a glass bottle and then toward the ends, using infrared or using 600°-900° F. hot gas.

In the prior art processes above discussed excessive heating cannot cause the sleeve to over-shrink as in the case of a sleeve applied to a molecularly oriented plastic bottle because the prior art rigid glass bottles obviously prevent excessive shrinkage. Moreover, there is no problem with respect to shrinkage or distortion of the bottle. But in the application of heat to a heat shrinkable plastic sleeve covering a heat sensitive or heat shrinkable plastic bottle, the problem was to find a way to shrink quickly the sleeve while avoiding appreciable shrinking of the bottle which would result if the high temperature infrared source or the 600°-900° F. gas of the cited references were used.

U.S. Pat. No. 4,011,122 also shrinks sleeves on glass bottles. Hot gas is used in one embodiment. The heating steps are first, a tacking step in a narrow mid-band and a later overall heating step wherein heated air is circulated throughout a tunnel area in an oven for overall shrinkage of the sleeve to the glass bottle. The sleeve material specifically disclosed is foamed polystyrene.

In contrast to the foregoing prior art the process of the present invention delivers rapidly low temperature heat (low relative to glass bottle references mentioned), to nonpreheated bottles that are of heat sensitive plastic, under conditions found to protect the plastic bottle as more fully explained hereinafter, including serially heating and shrinking the sleeve from the bottom progressively upwardly in successive horizontal, axially adjacent zones.

It is an object of the present invention to provide a process for heat shrinking plastic sleeves around heat sensitive plastic containers in a manner that does not distort or excessively shrink the container.

It is a further object to provide such a process that can be effected at high production rates in automatic machinery.

Other objects, as well as aspects and advantages, of the invention will become apparent from a study of this specification.

These and other objects are realized according to the present invention in which there is provided a process wherein a thermoplastic, usually pre-decorated, circumferentially heat shrinkable sleeve is telescopically placed around a heat sensitive plastic container or bottle which is linearly conveyed in an essentially upright position past heating means while being rotated about its vertical axis, heat being delivered serially to said sleeve in at least two horizontal, axially adjacent zones, said sleeve being heated in each such heating zone by direct impingement of hot gas against said sleeve, first in the lowermost zone and then progressively upwardly in successive axially adjacent heating zones ultimately to the topmost such heating zone which includes the top of said sleeve, thus shrinking the sleeve from the bottom progressively to the top thereof. It is an especially advantageous feature of the present invention that the apparatus used is controllable, and is usually controlled, so that the heat content of the gas delivered toward said sleeve in at least one of such heating zones is higher per unit vertical height of such sleeve than in a heating zone adjacent thereto.

According to a more specific aspect of the invention there is provided a process wherein a thermoplastic, usually pre-decorated, circumferentially heat shrinkable sleeve is telescopically placed around a thermoplastic, biaxially oriented, blow molded container or bottle which is linearly conveyed in an essentially upright position past heating means while being rotated about its vertical axis, heat being delivered serially to said sleeve in at least two horizontal, axially adjacent sleeve heating zones, said sleeve being heated in each such heating zone by direct impingement of hot gas against said sleeve, first in the lowermost zone and then progressively upwardly in successive sleeve heating zones ultimately to the topmost such heating zone which includes the top of said sleeve, thus shrinking the sleeve from the bottom progressively to the top thereof.

The total length of time that a bottle is conveyed past the heating means is usually less than 10 seconds and preferably less than 8 seconds and the highest average temperature of the gas impinged on the sleeve in the lowest temperature of said axially adjacent, horizontal heating zones is 330° F., although times and temperatures are of course varied because of many factors, including shrinkage rates of the sleeves and of the containers, container geometry, container size, wall thickness, etc.

The invention is better understood by reference to the drawings of which

Figure 1:
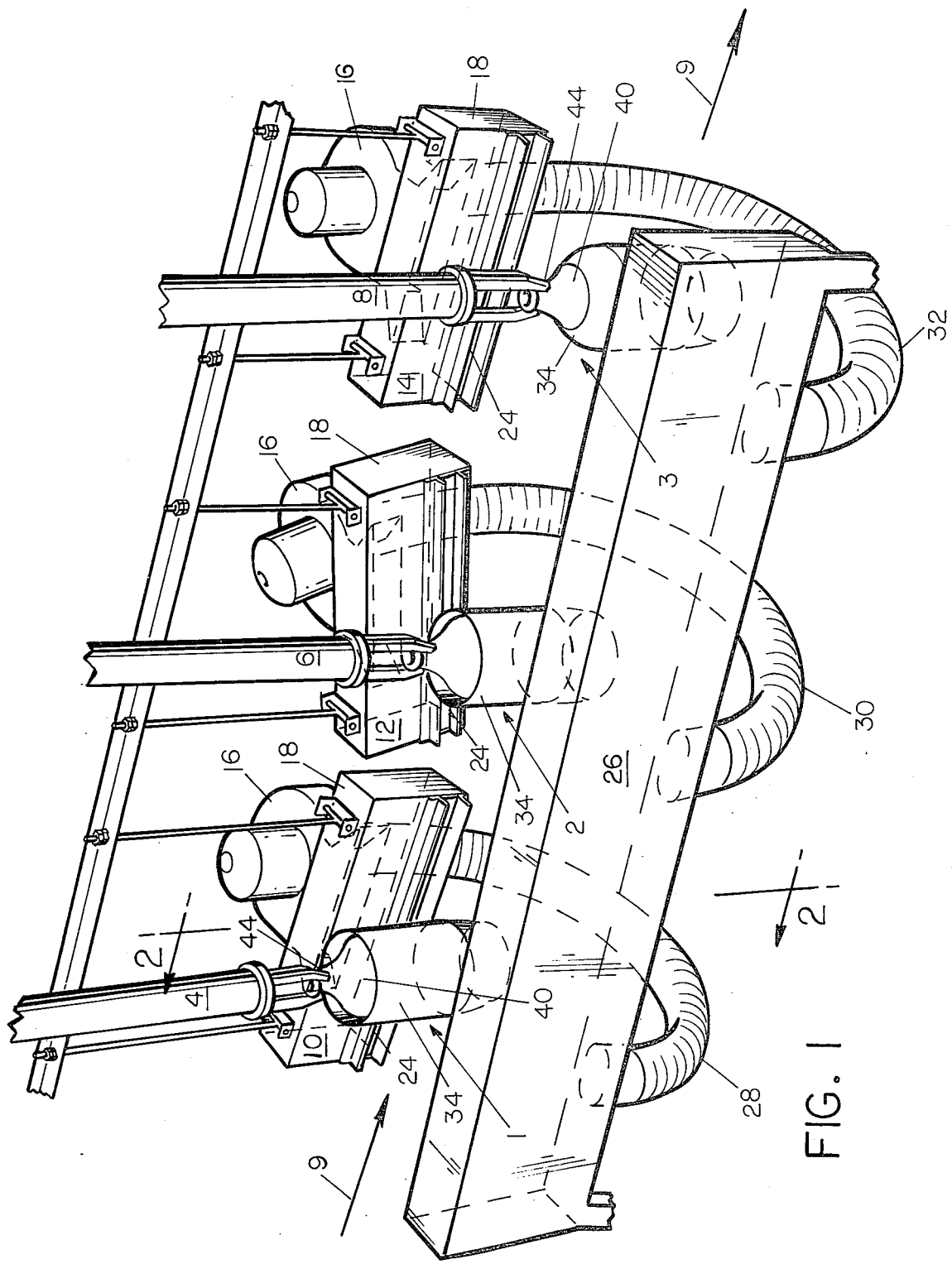
FIG. 1 is a perspective view of apparatus used in the method of the invention.
Figure 2:
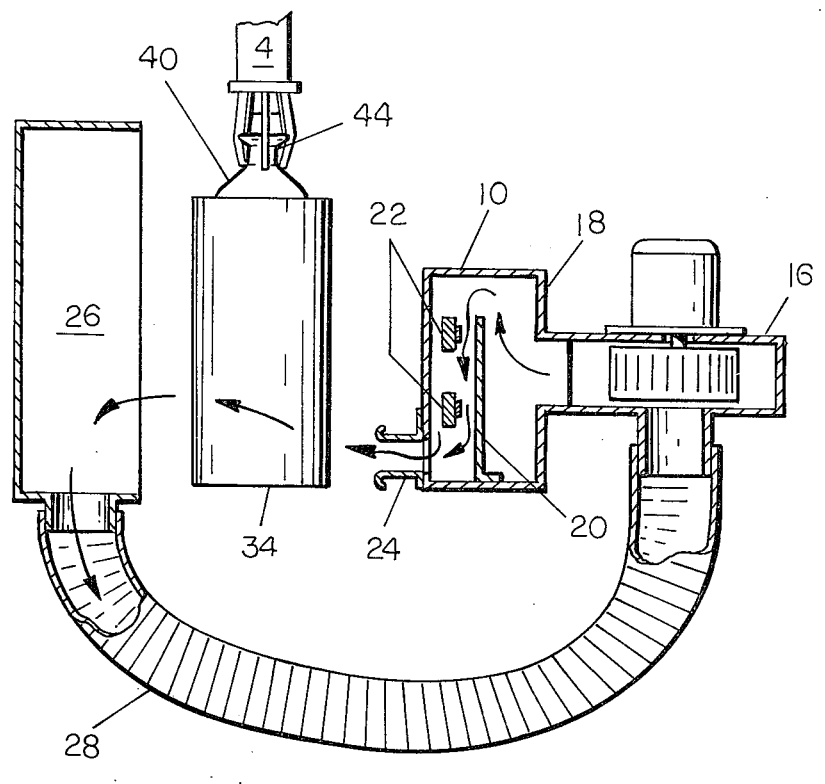
FIG. 2 is a cross-sectional view taken along the plane 2—2 of FIG. 1.
Figure 3:
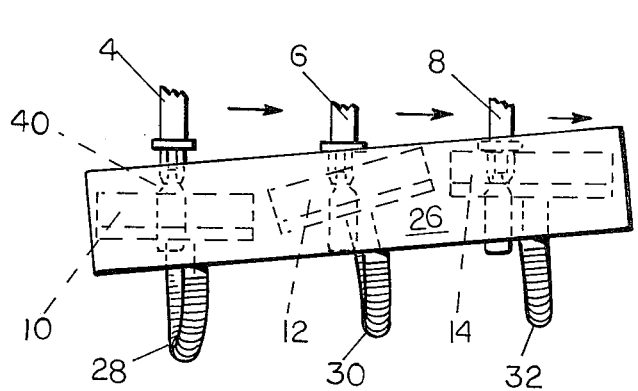
FIG. 3 is a side view of FIG. 1 showing the relationship of the bottles to the heating units of FIG. 1.

Referring now to FIGS. 1, 2 and 3, chucks 4, 6 and 8 are shown in positions 1, 2 and 3, respectively, and are mounted on means, not shown, which drive them linearly in the directions of arrows 9 while simultaneously rotating about their axes. Heating units 10, 12 and 14 are suitably supported in position by the framework and rods shown. Each heating unit has a blower or compressor 16 whose outlet is directly connected to plenum chamber 18 containing baffle 20 and one or more (two illustrated) electric resistance band heaters 22. Plenum chamber 18 has at its bottom longitudinal slit outlet 24 for delivering heated gas. Substantially horizontal collection chamber 26 is simply a five-sided rectangular box with the open side facing toward heating units 10, 12 and 14. On the bottom side of 26 conduits 28, 30, and 32 connect collection chamber 26 with the inlet to each of blowers 16, respectively, as shown. The line of bottles in the chucks between the heating units and the chamber 26 are open to the ambient atmosphere and are not in a heating tunnel, furnace or enclosure, so that there is not a general high temperature atmosphere in this zone.

In operation, each of chucks 4, 6 and 8 at a position not shown picks up a bottle by its neck or finish portion 44. Before the bottle is picked up, a molecularly oriented, preferentially circumferentially heat shrinkable, essentially cylindrical pre-decorated plastic sleeve is placed in position around each bottle, in the instance shown with the bottom of the sleeve being essentially coextensive with the bottom of the bottle, as in FIG. 4. Initially, each sleeve fits rather closely but loosely around the bottle. The bottles pass into the heating area in the direction of arrows 9 while rotating about their axes. The blowers suck air via collection chamber 26 into their inlet. This air is to a large extent air that has exited hot from the blowers through slits 24 but in addition includes fresh ambient air sucked into conduits 28, 30 and 32, respectively. Air issuing from blowers 16 passes into plenum chamber 18 over baffle 20 and is heated by band heaters 22 and exits through 24 to impinge on the circumferentially heat shrinkable, molecularly oriented plastic sleeves 34 carried on each bottle.

Each heating unit 10, 12 and 14 can be individually positioned by raising or lowering the unit or by tilting the heating unit as is shown in FIGS. 1 and 3 for the middle heating unit. Moreover, each heating unit is individually adjustable with respect to the amount of heated air delivered. Thus, each heating unit can deliver a different rate of flow of hot air or can deliver hot air at a different temperature, or both. Thus, as will be explained, it is a feature of the operation of the invention that the total heat delivered toward the film on a bottle is controlled to be different in at least two axially adjacent horizontal sections of the shrinkable sleeve, such total heat being a product of the rate of flow of hot gas toward the bottle and its temperature and length of time of delivery.

Figure 4:
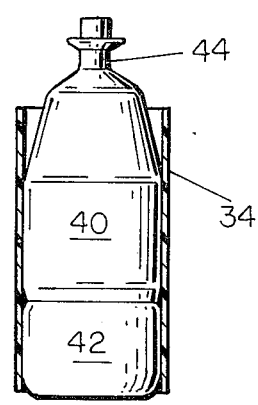
FIG. 4 shows a typical plastic bottle employed in the process of the invention.

In a now preferred embodiment of the invention, each of the bottles held in each of the chucks 4, 6 and 8 are of the general type depicted in FIG. 4. Thus, the bottle in FIG. 4 is blow molded, biaxially molecularly oriented poly(ethylene terephthalate) having a generally hemispherical, unstable, pressure bottom (not shown). Telescopically affixed to the bottom portion of the bottle 40 is generally cup-shaped support base 42 made of high density polyethylene. Sleeve 34 of a generally cylindrical shape is shown in cross-section around said bottle, loosely fitted thereto. The sleeve even though loose is retained by the bottle because in practice the sleeve is creased flat before inserting on the bottle, and as a result it will be retained on the bottle until heat shrunk thereto.

It will be seen that the sleeve is first heated near its bottom. Since the high density polyethylene cup protects the biaxially oriented bottle 40 from excessive heat in this area, a higher temperature can be applied. Moreover, since it is desired to thoroughly fasten the sleeve to the cup 42, and further, since the cup wall is thick and thus has a high heat capacity, more heat is delivered to this region by heating unit 10 than is delivered in the next station or portion by heating unit 12. Heating unit 12 covers the middle, usually thinnest portion of the bottle, and less heat is delivered per unit height of this middle portion by heating unit 12 toward the sleeve in this area in order to avoid deforming the bottle itself by excessive shrinkage thereof due to the bottle's character as a biaxially oriented and thus heat shrinkable, container. Furthermore, since the upper portion of the sleeve is adjacent to the smaller diameter portion of the bottle contiguous to neck or finish area 44, more heat per unit height is desirable in this section to be delivered by heating unit 14 than is to be delivered by heating unit 12. Furthermore, since the bottle wall in this general area and in the unprotected area just below neck 44 is thicker and therefor has a higher heat capacity, the bottle itself will stand the delivery of somewhat more heat to this area than to the thin middle portion.

While it has been mentioned that a now preferred embodiment of the invention is to have a less heat sensitive, separate support base 42 affixed to the bottom of the bottle, the invention is also of course applicable to a bottle that does not have a generally hemispherical bottom shape but that has in fact a stable, supporting shape which can for instance be somewhat the shape of support base 42. When such a bottle base is used, of course without a support base, it will normally have side and bottom walls of thicker plastic than the midsection of the bottle, simply for support purposes. Therefore, because of the higher heat capacity of a bottle of such shape, more heat can be delivered to this bottom area than to the thin med-section, just as described with respect to a bottle like 40 of FIG. 4.

While in a specific example to be described hereafter, the air velocity exiting from each of heating units 10, 12 and 14 was the same, with the temperature of the air exiting from each heating unit being different, it is to be understood that it is possible to keep the temperatures constant and vary the rate of delivery or velocity of air exiting from each of the slots 24 in order to vary the delivery of heat toward each of the vertical sections of the sleeve and bottle as previously described in FIGS. 1-4. It will be noted in fact that the amount of heat delivered toward the sleeve per unit vertical height by the middle heating unit 12 also tends to be less than delivered by heating unit 10 because heating unit 12 is slanted and the speed of travel of the bottle linearly is constant.

An advantage of the method of the invention wherein the sleeve is progressively shrunk from one end toward the other is that unsightly air bubbles are not trapped since the sleeve is applied and shrinks around the bottle from one end to the other squeezing the air out ahead of it as it goes.

It is also noted that it is important that the heating of the decorated sleeve be done by conductive heat transfer from the hot gas to the sleeve rather than by infrared heating as in some prior processes when applying sleeves to glass bottles. This is because a decorated sleeve has areas that absorb more infrared heat than other areas so that the sleeve would tend to shrink more on those decorated areas whose color makes the sleeve absorb radiant infrared energy at a greater rate than other areas, and the underlying bottle wall next to such a decorated area of the sleeve would tend to shrink locally and become distorted since it is biaxially oriented.

In a specific example according to the invention, plastic sleeves were applied to biaxially oriented poly(ethylene terephthalate) two liter bottles immediately after they were blow molded. The test application and shrinking of the sleeves was run in the apparatus described with respect to FIGS. 1-3. The bottles were 11⅝ inches high and of the approximate shape shown in FIG. 4. The sleeves were made of a plasticized poly(vinyl chloride) film material, 2 mils thick, known as XP-95 and manufactured by Reynolds Metals Company. The sleeves were molecularly oriented in the circumferential direction sufficient to have a heat shrinkage of 65 percent, with no more shrinkage than 5 percent in the transverse direction. The tensile strength in the circumferential direction, on 2 mil samples measuring 0.875×0.19 inches, at a strain rate of 1 inch per minute was 11,500 psi. and in the transverse direction was 3,700 psi. and elongation at break in the circumferential direction was 40 percent and was 135 percent in the transverse direction. The sleeves were lap welded and were about 1/20 of an inch in diameter larger than the largest diameter of the bottle and were creased, and partly because of the crease the sleeves did not fall off the bottles during processing and before heat shrinking.

The sleeves were placed on the bottle to extend from the bottom thereof and up 7.25 inches before shrinking. Since the sleeves in this test covered somewhat less than two-thirds of the height of the bottle, the third section or heating unit 14 as in FIGS. 1-3 was not employed. The bottles all contained the high density polyethylene base as described with respect to FIG. 4. The bottles were on chucks spaced about 9 inches center-to-center apart. The chucks rotated the bottles at 111 rpm. and the bottles traveled linearly through the apparatus in the direction of arrows 9 and took about six seconds to traverse the distance from the beginning of heating unit 10 to the end of heating unit 12. The slit openings 24 in heating units 10 and 12 were 1.25 inches in width and 34 inches long. The velocity of hot air issuing from the slits was approximately 950 ft. per minute and the average temperature of the air exiting from heating unit 10 was about 342° and exiting from heating unit 12 was about 300° F.

At the end of the test run, the labels were tightly shrunk over the bottles, including the heel area of the cup-shaped support base 42 and were without discernible air bubbles or the like, and the bottles were not misshapen.

Another set of bottles was made at the same time as the bottles in the test, and their volumes were measured at the time that the shrinking operation on the other set of bottles began. They averaged 1099 cc. and the bottles in the shrinking test averaged about 1089 cc. right after shrinking. Five days thereafter, the bottles that did not have sleeves applied averaged about 1079 cc. and the bottles with sleeves applied in the test averaged 1074 cc. This illustrates the fact that the process of the invention slows down the rate of shrinkage.

Returning now to a consideration of the volume of freshly formed biaxially oriented bottles which were not labeled, tests showed that the bottles shrunk about 6.5 cc. between 2 minutes and 70 minutes after molding and 2 cc. between 70 and 135 minutes after molding but only about 2 cc. between about 4100 minutes and 7200 minutes (a span of nearly 52 hours) after molding, all at room temperature. In other words, the shrinkage of plastic biaxially oriented bottles is relatively very great right after molding but "old" bottles such as the bottles already formed five days earlier shrink very slowly unless their temperature is appreciably elevated.

It will be remembered that, in the tests of the bottles according to the specific example given above, the shrinkage of the bottle due to the heating operation was only 10 cc. even though the tests were run on just-formed bottles.

Keeping the foregoing facts in mind, consider the following tests which were made, not on freshly formed biaxially oriented bottles, but on biaxially oriented bottles which were in fact more than five days old and had already undergone the bulk of normal room temperature shrinkage. Thus, in order to illustrate the advantages of the progressive heating of the label and the differential heating of different portions of the label adjacent to different parts of the bottle, it was attempted to shrink labels to bottles by heating the entire bottle and sleeves uniformly in an oven under much milder conditions of temperature in order to avoid distortion or excessive shrinkage of the bottle itself. In one test the more than five-day old bottle was placed upright in a hot air heater wherein the hot air was flowing downwardly over the bottle. The hot air was maintained at only 140° F. and the bottle was kept in the oven for 8 minutes. At the end of this 8 minutes, the shrinkage suffered by the old bottle, which had already shrunk presumably more than 20 cc. since molding, was 14.6 cc. due to the labeling operation. However, the time-temperature heating conditions were still not enough to shrink the label around the bottom heel of the support base which was relatively thick, of course, and thus had a high heat capacity. In another test, a bottle was placed in a chuck with the finish facing downwardly at a 45° angle and rotated. In the same furnace the temperature of the downwardly flowing air was raised so that 194° F. hot air passed over the bottle and this was continued for only 36 seconds. The bottle had lost another 6.4 cc. of volume and although the label was shrunk apparently tightly around the bottle above the support base, on the support base there were many large bubbles of air trapped as a result of obviously insufficient shrinkage in this area.

Thus, the efficacy of the process of the present invention, making possible a relatively high rate of heating next to high heat capacity, less heat sensitive portions of the bottle, or next to a portion of the bottle requiring a large degree of shrinkage of the label to fit the bottle, is apparent. The present process allows high temperature (relative to the shrinkage or distortion temperature of an oriented bottle) heating and a high rate of shrinkage by avoiding delivering heat toward or opposite any one portion of the biaxially oriented bottle for any extended period of time, this being accomplished by the progressive application of heat from one end of the bottle axially toward the other end thereof. Thus, there is very little time for the direct transfer of heat from the label to the material of the bottle before the bottle is completely outside the direct influence of the heating medium and being cooled by the ambient surroundings, or by force cooling if desired. In contrast if one had to heat the entire assembly of cylindrical plastic label or sleeve and bottle uniformly in a furnace, much lower temperatures are required because the bottle would have time to assume furnace temperature and would unfortunately undergo an unacceptable amount of shrinkage.

While the present invention has been described in a specific example with respect to a poly(vinyl chloride) sleeve and a poly(ethylene terephthalate) container, the inventive process is applicable using other preferentially circumferentially shrinkable thermoplastic sleeves or other heat sensitive plastic containers, or both.

As will be evident to those skilled in the art, various modifications of this invention can be made or followed in the light of the foregoing disclosure and discussion without departing from the spirit and scope of the disclosure or from the scope of the claims.

I claim:

1. A process which comprises loosely telescopically fitting a thermoplastic, circumferentially heat shrinkable sleeve around a heat sensitive plastic container, linearly conveying said container in an essentially upright position past heating means while rotating it about its vertical axis, heat being delivered serially to said sleeve in at least two horizontally, axially adjacent zones of said sleeve, said sleeve being heated in each such heating zone by direct impingement of hot gas against said sleeve, first in the lowermost zone and then progressively upwardly in successive heating zones ultimately to the topmost heating zone which includes the top of said sleeve, thus shrinking the sleeve from the bottom progressively to th top thereof, wherein said container is heat sensitive in the sense that it would inherently shrink or become misshapen if it reached the temperature of said hot gas, but wherein said process is effected too rapidly for said container to be heated to said temperature at which it would otherwise shrink or become misshapened, the heat content of the gas delivered toward said sleeve in at least one of said heating zones being higher per unit vertical height of the sleeve than in a heating zone adjacent thereto and the portion of the container directly opposite said at least one heating zone being more resistant to a given amount of heat delivered toward said sleeve in at least one said heating zone than the next axially adjacent portion of the container.

2. A process of claim 1 wherein said sleeve is predecorated before fitting onto said container.

3. A process of claim 2 wherein said container is a thermoplastic, biaxially oriented, blow molded container.

4. A process of claim 3 wherein said container is a bottle made from poly(ethylene terephthalate).

5. A process which comprises providing a heat sensitive, thermoplastic, biaxially oriented, blow molded container, the bottom portion of said container being more tolerant of heat delivered toward the surrounding sleeve recited hereafter per unit height than the adjacent relatively thin-walled mid-portion of said container, either because it is protected by an applied surrounding base support member or because the bottom portion of the container has thicker walls, loosely telescopically fitting a predecorated thermoplastic, circumferentially heat shrinkable sleeve around said container, linearly conveying said container in an essentially upright position past heating means while rotating it about its vertical axis, heat being delivered serially to said sleeve in at least two horizontal, axially adjacent zones of said sleeve, said sleeve being heated in each such heating zone by direct impingement of hot gas against said sleeve, first in the lowermost zone and then progressively upwardly in successive heating zones ultimately to the topmost heating zone which includes the top of said sleeve, thus shrinking the sleeve from the bottom progressively to the top thereof, wherein said container is heat sensitive in the sense that it would inherently shrink or become misshapen if it reached the temperature of said hot gas, but wherein said process is effected too rapidly for said container to be heated to said temperature at which it would otherwise shrink or become misshapened, the heat content of the gas delivered toward said sleeve in said lowermost heating zone being higher per unit vertical height of the sleeve than in the heating zone adjacent thereto, and the portion of the container directly opposite said lowermost zone being more resistant to a given amount of heat delivered toward said sleeve in said lowermost zone than the next axially adjacent, thin-walled, mid-portion of the container.

6. A process of claim 5 wherein said container is made of a polyester.

7. A process of claim 5 wherein said container is a bottle made from poly(ethylene terephthalate).

8. A process of claim 5 wherein said sleeve is non-cellular.

9. A process of claim 5 wherein said thermoplastic is made of a poly(vinyl chloride) composition.

10. A process according to claim 5 wherein the portion of the container next to said mid-portion of the container is contiguous to the neck area and is of smaller diameter and therefore thicker walled than the mid-portion, and wherein more heat per unit height of the sleeve opposite the smaller diameter area is delivered than toward the said mid-portion.

* * * * *